(12) United States Patent
Chadwell et al.

(10) Patent No.: US 7,318,353 B2
(45) Date of Patent: Jan. 15, 2008

(54) METHOD AND APPARATUS FOR A PRODUCT DISPLACEMENT SENSING DEVICE

(75) Inventors: Thomas J. Chadwell, San Antonio, TX (US); Michael T. Romanyszyn, San Antonio, TX (US); John Vira, Lockhart, TX (US)

(73) Assignee: Lancer Partnership Ltd., San Antonio, TX (US)

( * ) Notice: Subject to any disclaimer, the term of this patent is extended or adjusted under 35 U.S.C. 154(b) by 0 days.

(21) Appl. No.: 11/021,403

(22) Filed: Dec. 22, 2004

(65) Prior Publication Data

US 2006/0130592 A1    Jun. 22, 2006

(51) Int. Cl.
    *G01N 3/02* (2006.01)
(52) U.S. Cl. ....................................................... 73/856
(58) Field of Classification Search ................... 73/856
    See application file for complete search history.

(56) References Cited

U.S. PATENT DOCUMENTS

| | | | | |
|---|---|---|---|---|
| 3,149,492 A * | 9/1964 | Weinberg | ..................... | 73/724 |
| 3,866,473 A * | 2/1975 | Teitelbaum et al. | ........... | 73/726 |
| 4,185,808 A * | 1/1980 | Donohoe et al. | ...... | 248/295.11 |
| 4,256,094 A * | 3/1981 | Kapp et al. | .................. | 601/152 |
| 4,428,233 A * | 1/1984 | Lynn | ............................ | 73/315 |
| 4,845,464 A * | 7/1989 | Drori et al. | .................. | 340/429 |
| 5,010,890 A | 4/1991 | Pfohl et al. | .................. | 600/528 |
| 5,031,460 A * | 7/1991 | Kanenobu et al. | ............. | 73/730 |
| 5,087,245 A | 2/1992 | Doan | ........................... | 604/67 |
| 5,096,385 A | 3/1992 | Georgi et al. | .................. | 417/18 |
| 5,103,211 A | 4/1992 | Daoud et al. | ................ | 340/608 |
| 5,111,817 A * | 5/1992 | Clark et al. | .................. | 600/323 |
| 5,321,991 A * | 6/1994 | Kalotay | .................. | 73/861.357 |
| 5,343,737 A * | 9/1994 | Baumoel | .................. | 73/40.5 R |
| 5,609,576 A | 3/1997 | Voss et al. | ..................... | 604/67 |
| 5,718,232 A * | 2/1998 | Raines et al. | ................ | 600/507 |
| 5,855,589 A * | 1/1999 | McEwen et al. | ............. | 606/202 |
| 5,993,396 A * | 11/1999 | Friedman et al. | ........... | 600/490 |
| 6,113,549 A * | 9/2000 | Johnson | ....................... | 600/529 |
| 6,293,758 B1 | 9/2001 | Green et al. | ................... | 417/53 |
| 6,299,020 B1 | 10/2001 | Sudolcan et al. | .............. | 222/1 |
| 6,463,813 B1 * | 10/2002 | Gysling | .................... | 73/862.59 |
| 6,565,592 B2 * | 5/2003 | Mach | .......................... | 606/202 |
| 7,101,338 B2 * | 9/2006 | Yang | ........................... | 600/485 |
| 2003/0056565 A1 * | 3/2003 | Barbe | .......................... | 73/1.59 |

* cited by examiner

*Primary Examiner*—Max Noori
(74) *Attorney, Agent, or Firm*—Christopher L. Makay

(57) ABSTRACT

A displacement sensing device transduces deflection of a body disposed around a conduit into complementary signals indicative of the amount of displacement experienced by the conduit. The displacement sensing device includes a cuff and a sensor disposed on an outer periphery of the cuff, and may further include a controller in communication with the sensor, such that the controller receives signals from the sensor and compares the current signals to a normal operating range. The normal operating range may be predetermined or derived based on trends, thereby allowing the controller to adapt to any product disposed within the conduit. Once the range is determined, the controller is able to discern when the product system is out of product, or operating at elevated pressures. In alternative embodiments, a pumping device or an inductor may generate a recognizable wave pattern that may be monitored to determine if the product system contains product.

25 Claims, 15 Drawing Sheets

METHOD AND APPARATUS FOR A PRODUCT DISPLACEMENT SENSING DEVICE

BACKGROUND OF THE INVENTION

1. Field of the Invention

The present invention relates to product systems and, more particularly, but not by way of limitation, to methods and an apparatus for monitoring a product package to determine when an installed package is out of an operating position, as well as when the product system is out of product.

2. Description of the Related Art

In the areas of beverage dispensing and beverage dispensers, manufacturers often are tasked to outfit dispensers with features that provide operators with an immediate notification of a package in an empty state, commonly known in the industry as a sold-out condition. Since most modem beverage dispensers include multiple nozzles to provide consumers with a variety of products, dispenser manufacturers are forced to provide sold-out condition solutions for a wide range of product consistencies, viscosities, translucencies, and interchangeabilities. Further, problems arise when the products offered are fruit or vegetable based, as fruits and vegetables may vary from season to season or even tree to tree, thereby creating differences between batches of fruit or vegetable based drinks or concentrates.

Attempts by manufacturers to address this type of problem have led to various forms of low-level detection and sold-out notification schemes, including both invasive and non-invasive methods. Invasive methods such as electrical conductivity checks at locations internal to the product stream do work on products that do not leave a residual film. Some residual films conduct equally as well as the product stream, thereby providing false, delayed, or even non-existent signals.

Non-invasive methods are typically more difficult to implement because the product packaging such as tubing wall material often disrupts or skews readings. Illustratively, bubble sensors are used to check for bubbles in a tube when using products that have air in the product package. Bubble sensors are not effective on product packages that have no air. Likewise, optical sensors may be utilized to detect changes in color, however, optical sensors do not work well when detecting through a silicone tube, henceforth, it gets increasingly difficult to create a solution that is able to handle most or all product types and flavors.

Accordingly, a method and apparatus that provides operators with an immediate notification of an empty package would be beneficial to operators and beverage dispenser manufacturers.

SUMMARY OF THE INVENTION

In accordance with the present invention, a displacement sensing device transduces deflection of a body disposed around a conduit into complementary signals indicative of the amount of displacement experienced by the conduit. The displacement sensing device includes a cuff and a sensor disposed on an outer periphery of the cuff. The displacement sensing device may further include a controller in communication with the sensor, such that the controller receives signals from the sensor and compares the current signals to a normal operating range. Further, the controller may derive the normal operating range based on past trends, thereby allowing the controller to adapt to virtually any form or consistency of product located within the conduit. Once a normal operating range is determined, the displacement sensing device is able to determine if the product system is out of product, as well as when the product system is operating at elevated pressures.

In a second embodiment, the displacement sensing device further includes a pumping device to positively displace the product in the product system. Upon the positive displacement phase of the pumping cycle, the product is forced through the product system downstream of the pumping device, including the conduit. Displacement at the conduit associated with the positive displacement phase of the pumping device is received by the sensor, thereby producing a discernable wave pattern. The controller may then monitor the wave pattern to determine whether the product system has product, as well as whether the product system is operating at an elevated pressure.

In a third embodiment, the displacement sensing device includes at least one fluid wave inductor. The fluid wave inductor is located adjacent to a product supply, and induces a fluid wave into the product supply. The fluid wave moves through the product system to the sensor of the displacement sensing device. The controller then receives the signals and creates a normal operating range for comparison to the current signals, and determination of whether the product system has product.

In a fourth embodiment, the displacement sensing device is utilized in a product dispenser to determine if a product system in a product valve has product or is operating at an elevated pressure.

Further embodiments include a liquid level sensing device, and fluid level indicator. The liquid level sensing device utilizes the displacement sensing device to discern the existing level of a fluid based upon the deflection of the conduit at the sensor. The fluid level indicator utilizes the displacement sensing device in combination with at least on fluid wave inductor to determine if fluid exists up to the level of the fluid wave inductor last activated.

It is therefore an object of the present invention to provide a displacement sensing device that delivers a signal indicative of the displacement of a conduit.

It is a further object of the present invention to receive the signals delivered by the sensor with a controller, wherein the current signal are compared to past trends to determine if the product system is operating within a normal operating range.

It is still further an object of the present invention to derive a normal operating range to provide the ability to learn virtually any product It is still yet further an object of the present invention to provide a product dispenser utilizing a displacement sensing device a sold out notification.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

In a first embodiment, a displacement sensing device transduces deflection of a body disposed around a conduit into complementary voltage signals to describe an associated displacement of the conduit. In a second embodiment, a displacement sensing device transduces impulses produced by a pumping device in a product flow into discernable voltage readings. The readings are monitored to provide a method for determining when a flow of a product has been exhausted, as well as whether a pumping device is in an engaged position. A third embodiment provides for using the displacement sensing device in a product dispenser as a sold out indicator, and to determine whether the conduit is properly installed. A further extension of this invention provides for inducing a fluid wave into a product stream to monitor the displacement of the conduit, and in turn, discern when a package in a product dispenser has been emptied or disengaged.

Figure 1A:
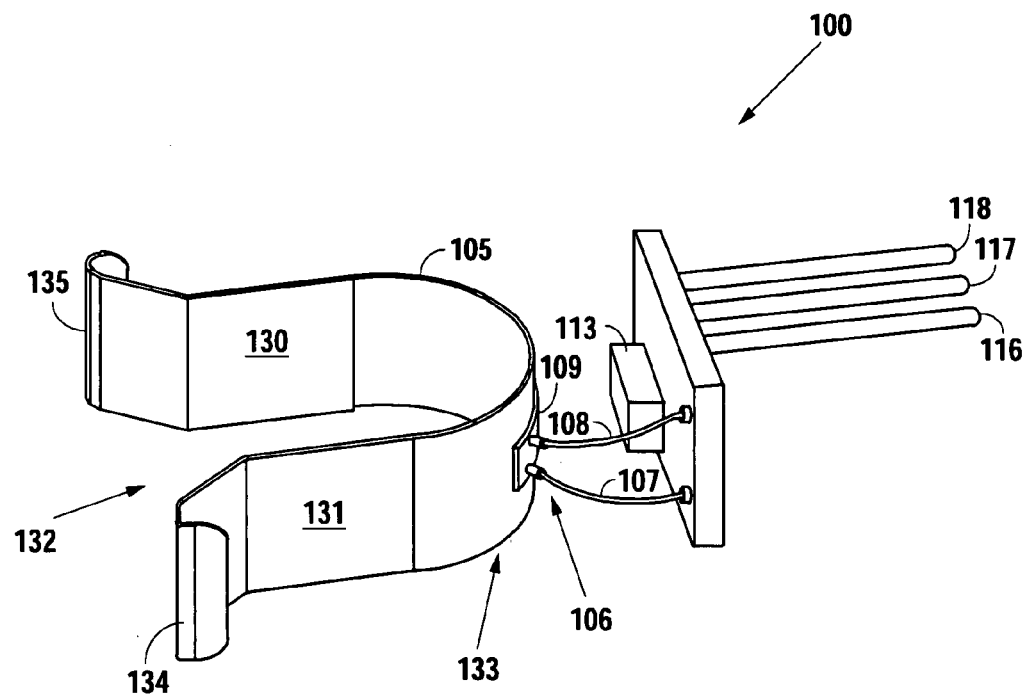
FIG. 1*a* provides a perspective view of a displacement sensing device according to a first embodiment.
Figure 1B:
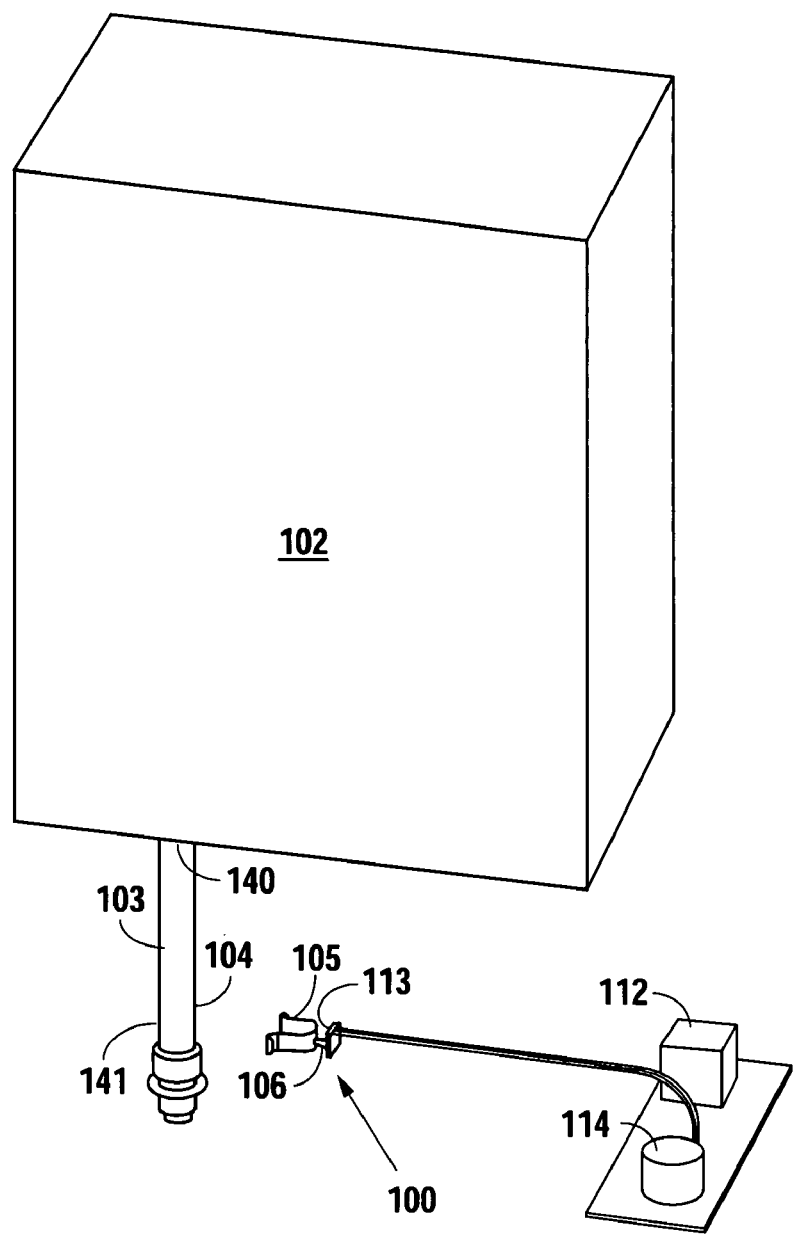
FIG. 1*b* provides a perspective view of the displacement sensing device including a controller according to the first embodiment.

As shown in FIG. 1, a displacement sensing device 100 includes a cuff 105 and a sensor 106 that senses deflection of the cuff 105. In this first embodiment, the cuff 105 may be any structure suitable to engage a conduit, and includes an inner surface 130, an outer surface 131, a first end 132, and a second end 133. A portion of the second end 133 of the cuff 105 is of a shape complementary to an outer periphery 104 of a conduit 103. The cuff 105 further includes a first angled lead-in 134 and a second angled lead-in 135. The angled lead-ins 134 and 135 create an increased engagement span between the first angled lead-in 134 and the second angled lead-in 135 for accepting the conduit 103. The cuff 105 may be constructed from any material capable of being formed and elastically deformed, preferably stainless steel, such that the cuff 105 may deflect when loads are applied to the inner surface 130 of the cuff 105, and return to a predetermined position when the applied loads are removed.

The sensor 106 may be any device suitable for sensing flexure in an object, and producing an output discernable through commonly known methods including analog signals, voltage readings, or any other form suitable for transmitting data to an input device. Illustratively, a strain gauge may be utilized to sense deflection due to applied forces and output a signal proportional to the amount of deflection. In this first embodiment, the sensor 106 is a strain gauge. The sensor 106 includes a body 109, a first lead 107 and a second lead 108. The body 109 of the sensor 106 may be of a conductive material that transmits variable electric potential at a remaining lead when a voltage is applied at a first lead. In this first embodiment, the body 109 is of a flexible film construction, mylar for example, such that the body 109 may be rigidly adhered to a load receiving object, in this case the cuff 105. One lead 107 or 108 of the sensor 106 may be energized to create an output voltage that can be monitored at the opposite lead. As the body 109 deflects, the resistance characteristics of the body 109 change, thereby altering the voltage output by the strain gauge.

The displacement sensing device 100 may further include a controller 112 or a signal conditioner 113 utilized in conjunction with the controller 112, and an alarm 114. The controller 112 may be any form of processing device suitable for controlling and processing signals, including microcontrollers, processors, and the like. The signal conditioner 113 may include a power in pin 116, power out pin 117, and a signal out pin 118. The alarm 114 may be any form of warning mechanism that may provide a warning to an operator or user of the displacement sensing device 100, such as audio alarms, buzzers, chimes, or lights.

The conduit 103 includes a first end 140 connectable to a product source 102, and a second end 141 designed to output the product from the product source 102. In this disclosure, conduit is defined to include tubing, pipes, or any other apparatus that is able to house and transport a fluid from a product source to a point of use, including disposable packaging. The second end 141 may be connectable to any form of a dispensing nozzle, mixer, or the like, used in dispensing of the product. In this first embodiment, the conduit 103 is a flexible tube constructed from silicone. While the conduit 103 is being shown as being flexible, one of ordinary skill in the art will recognize that rigid piping or tubing may be utilized in this disclosure provided that at least a portion of the conduit system allows measurable deflection due to displacement of a product, illustratively, a section of flexible tubing, a diaphragm on the conduit, or the like.

The product source 102 may be any form of product container suitable for housing a product, including disposable packaging, storage tanks, vats, remote piping, or product packaging suitable for use in the product dispensing industry, for example, sealed plastic bags, blow-molded packages, cartons, and the like. The product source 102 may contain any form of flowable products, including food products, non-food products, beverages, or concentrates thereof. Product packages are typically filled at a production facility, sealed, and distributed for consumption. It should be clear to one of ordinary skill in the art that both disposable and reusable packages may be utilized to house product for dispensing.

On assembly, the sensor 106 is rigidly adhered to the outer surface 131 of the cuff 105, preferably across a symmetrical axis, such that the deflection in the cuff 105 is transmitted to the sensor 106. In this first embodiment, the sensor 106 is glued to the outer surface 131 of the cuff 105 using cyanoacrolate to provide a rigid and secure bond to the cuff 105. The leads 107 and 108 are then connected to any complementary device suitable for receiving and processing the output signals, illustratively the controller 112 or a signal conditioner 113 utilized in combination with the controller 112. In this embodiment, the output signals of the sensor 106 are voltages. The voltages are amplified by the signal conditioner 113.

In use, the cuff 105 is placed over the conduit 103 between the product source 102 and the second end 141. The cuff 105 is forced to deflect as it moves over the conduit 103. Upon full engagement, at least a portion of the outer periphery 104 of the conduit 103 is adjacent to the inner surface 130 of the cuff 105. The deflection of the cuff 105 and the rigid attachment of the body 109 to the cuff 105 forces the body 109 of the sensor 106 to deflect with the cuff 105, thereby creating an output voltage with a magnitude in direct relation to the amount of displacement experienced by the cuff 105.

Figure 2A:
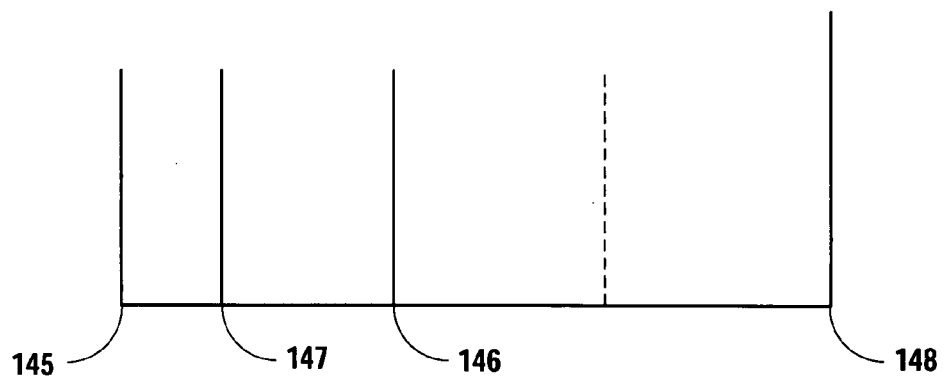
FIG. 2a provides a graphical representation of one possible output voltage scheme and the associated indications.

As shown in the graph in FIG. 2a, a reference voltage 145 may be recorded without a conduit 103 installed into the cuff 105. As there is no deflection at that point, the reference voltage 145 should be the lowest reading possible. An installed voltage 147 represents the voltage reading that exists when the conduit 103 is inserted into the cuff 105. A low threshold limit voltage 146 may be associated with a lower end of a normal operating range of the displacement sensing device 100, and a high threshold limit voltage 148 may be used as an upper limit of the normal operating range. Voltages higher than the normal operating range may be of concern as blockages within the product system may create excessive pressures in the conduit 103, and ultimately, failure of the product containment system. Voltages below the normal operating range may indicate that reduced deflections are being experienced at the cuff 105 due to a nearly empty or empty conduit 103.

In this first embodiment, the normal operating range is derived by the controller 112 over a learn interval, illustratively four to five dispenses. The controller 112 records the voltages output by the displacement sensing device 100 and averages the output voltages over the learn interval to determine an average value or baseline voltage. Once the baseline voltage has been established, the controller 112 applies a tolerance, illustratively, plus or minus ten to fifteen percent, to the baseline voltage to create the normal operating range. After the learn interval, the controller 112 compares the output voltages to the baseline voltage to determine certain states of the product system. In this configuration, the displacement sensing device 100 is able to adapt to virtually any product type, flavor, or consistency of product. The product remains learned until the controller 112 registers that the conduit 103 has been removed from the cuff 105 and that a conduit 105 has been reinserted into the cuff 105.

Figure 2B:
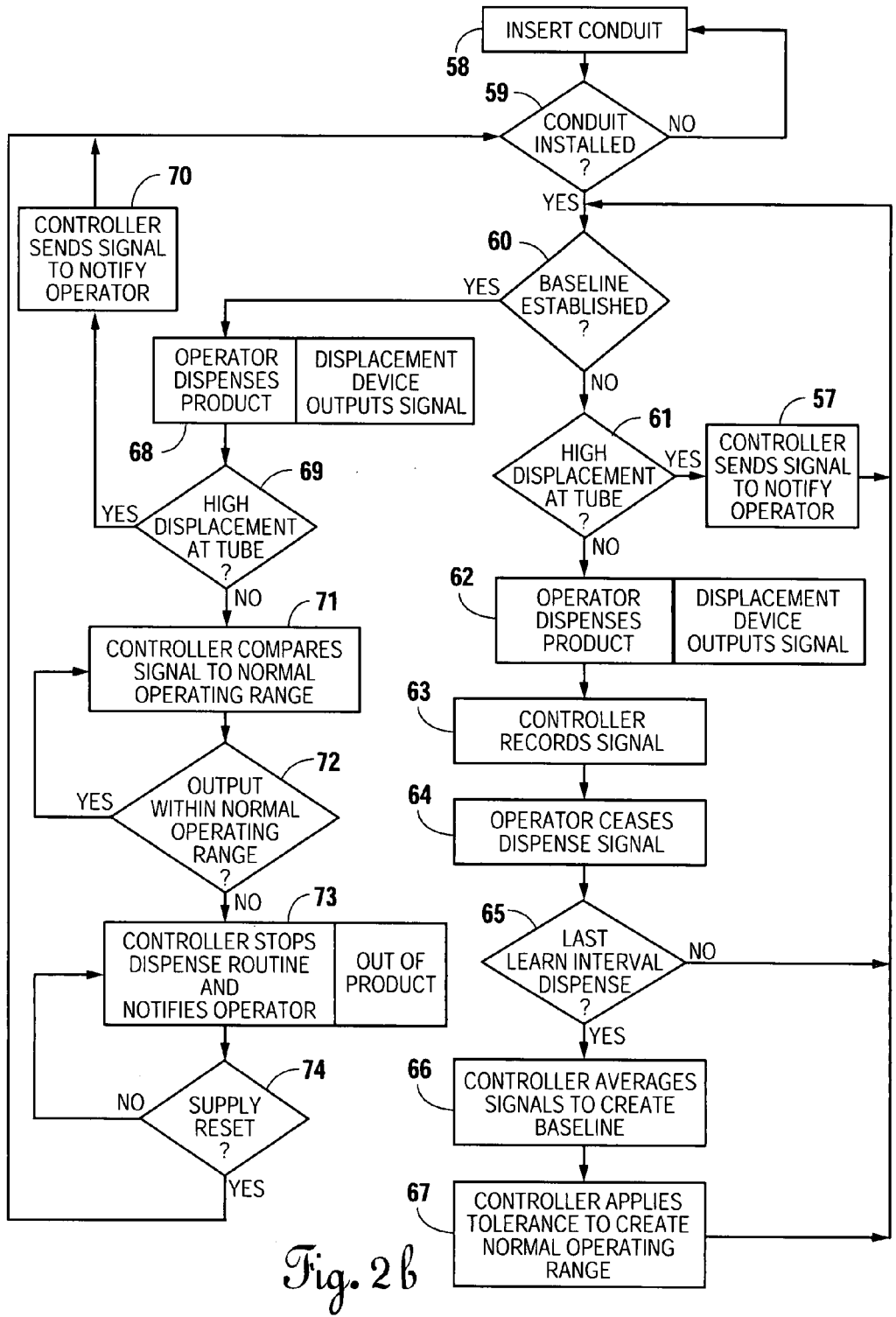
FIG. 2b provides a flowchart illustrating the method steps utilized to determine if a product system is out of product according to the first embodiment.

The method steps for deriving the baseline voltage and applying the tolerance are provided in FIG. 2b. The process commences with step 58, wherein an operator must insert a conduit 103 into the cuff 105. Once the conduit 103 is installed, the controller 112 verifies that the conduit 103 remains in the cuff 105 as shown in step 59. If the conduit 103 is not installed in the cuff 105 in step 59, the process returns to step 58, wherein the operator must reinsert the conduit 103. If the conduit 103 remains in the cuff 105, the process moves to step 60, wherein the controller 112 determines if a baseline voltage has been established. If a baseline voltage has not been established in step 60, the controller 112 proceeds to step 61, wherein it determines if a high displacement condition exists at the cuff 105. If a high displacement condition does exist in step 61, the controller 112 must provide a signal to notify the operator of the high displacement condition, step 57. The operator would then be required to alleviate the high pressure condition associated with the high displacement condition. The controller 112 may return to step 59 when the high displacement condition is alleviated. If a high displacement condition does not exist in step 61, the controller 112 proceeds to step 62 to await a dispense command from an operator. Once a dispense command has been initiated, the controller 112 provides commands to commence the dispense. Once the dispense commences, the displacement sensing device 100 outputs voltages in proportion to the amount of displacement that the conduit is experiencing at the cuff 105. Step 63 provides for the controller 112 recording the voltages provided by the displacement sensing device 100.

Once the operator ceases the dispense routine, step 64, the controller 112 determines whether the dispense was the last dispense of the learn sequence, step 65. If the dispense was not the last required for the learn sequence, the controller 112 proceeds to step 59 to commence the routine. If the dispense was the last dispense required for the learn sequence, then the controller 112 averages the voltages provided by the displacement sensing device 100 to create a baseline voltage, step 66. Once the baseline voltage has been created, the controller 112 applies a tolerance value to the baseline voltage to derive a normal operating range, step 67. The process then returns to step 59 to commence the process once again.

If the controller 112 determines that a baseline voltage has been established for the product in step 60, the controller 112 proceeds to step 68, wherein it awaits a dispense command from an operator. Once a dispense command has been received, the controller 112 determines if a high displacement condition exists, step 69. If a high displacement condition does exist in step 69, the controller 112 proceeds to step 70, wherein the controller 112 sends a signal to the operator, thereby notifying the operator of the high pressure condition associated with the high displacement condition. If a high displacement condition does not exist in step 69, the controller 112 moves to step 71, wherein the controller 112 commences to compare the output voltages to the normal operating range, step 72. If the controller 112 determines that the output voltages are within the normal operating range, then the controller 112 returns to step 73 for continued comparison. If the controller 112 determines that the output voltages in step 72 are outside of the normal operating range, then the controller 112 proceeds to step 73, wherein the controller 112 determines that the product system is out of product, stops the dispense routine, and sends a signal. The signal may be any type of warning, signal, or complement thereof. The controller 112 then proceeds to step 74 to determine if the product supply has been reset. If the product supply has been reset in step 74, the controller 112 may proceed to step 59 to restart the routine. If the product supply has not been reset in step 74, the controller 112 may return to step 73 to initiate an additional signal.

In this configuration, varied voltages may be output by the displacement sensing device 100 based upon the expansion experienced by the conduit. Over time, the controller 112 processes the voltages output by the sensor 106 and compares the output voltages to the normal operating range to determine the current state of the pumping system, including whether the conduit 103 is properly situated within the cuff 105, when excessive pressures are present in the system, when the system is operating within the normal operating range, and when the product source 102 is out of product. Trend voltages or voltages over a specific amount of time are typically utilized in lieu of single point data to minimize the possibility of errant readings.

In a first state, the conduit 103 is not installed in the cuff 105, and the reference voltage 145 is produced. In a second state, the conduit 103 is installed into the cuff 105, and an installed voltage 147 is obtained. The two distinct states provide the controller 112 with the ability to always discern whether a conduit 103 is installed into the cuff 105.

In a third state, the voltages from the sensor 106 are averaged to create the baseline voltage around which the normal operating range is centered, illustratively between the low threshold limit voltage 146 and the high threshold limit voltage 148. As such, the controller 112 may discern when the product system is operating within the normal operating range.

In a fourth state, the controller 112 recognizes an excessive displacement condition due to increased pressures within the conduit 103, illustratively, voltage readings above the normal operating range. While it is desirable to provide a slight amount of back pressure on the product system, one of ordinary skill in the art will recognize that excessive pressures may cause ruptures in the product system, or skew product displacement. It is imperative that the excessive pressures be alleviated in the product system. Excessive pressures in a direct flow system as described in this embodiment may be alleviated by temporarily separating the product source 102 from the conduit 103 with any number of devices, including a shutoff, a valve, or even manually by pinching a flexible hose.

Figure 3A:
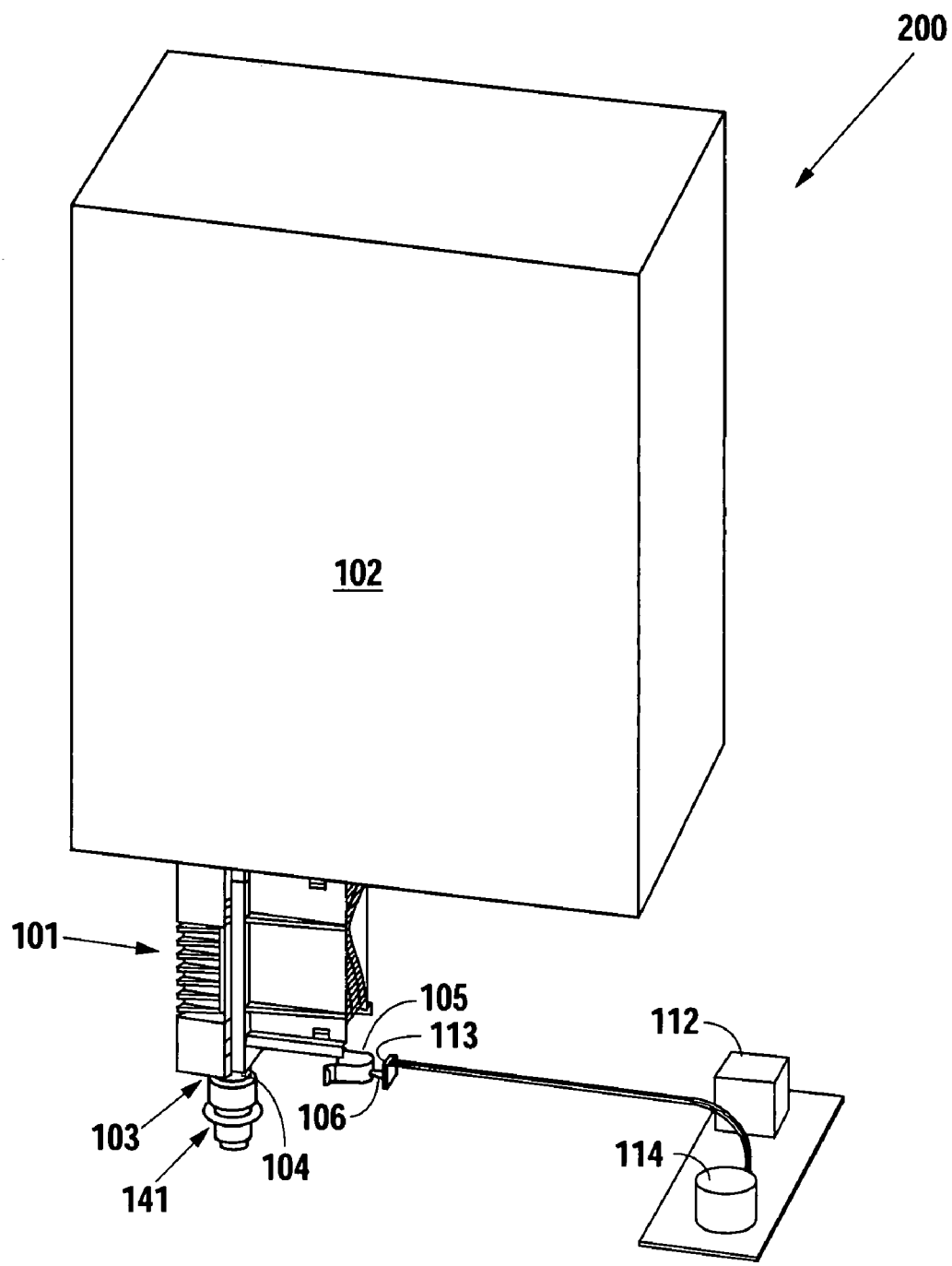
FIG. 3a provides a perspective view of the displacement sensing device including a pumping device according to a second embodiment.

A second embodiment is virtually identical to the first embodiment in shape and fashion, however, the second embodiment further comprises a pumping device 101 to move product from the product source 102 to the second end 141 of the conduit 103. Accordingly, like parts have been numbered with like numerals. As shown in FIG. 3a, a displacement sensing device 200 includes all components of the first embodiment, and a pumping device 101 in communication with the conduit 103.

The pumping device 101 is utilized to displace the product flowing through the conduit 103 or the product system. The pumping device 101 may be located between the product source 102 and the second end 141 of the conduit 103. In this second embodiment, the pumping device 101 may be invasive to the system, or external thereto. While it is possible to displace the product with an invasive pumping system, it is well understood in the art that in food product and food product concentrate dispensing it is desirable to utilize external pumping methods to eliminate the cleansing of the pumping device 101 and the possibility of unsanitary conditions within an invasive pump. External pumping devices commonly utilized in the industry include peristaltic pumps, sequential lobe pumps, and the like. Most pumping devices produce a pressure spike that accompanies the product displacement phase of a pumping cycle.

Most positive displacement pumping devices 101 induce a cyclical pressure wave pattern into the product. The cyclical pressure wave pattern is transmitted throughout the product stream, predominantly through the downstream portion of the system, including the conduit 103. As the pressure of the product increases due to the displacement of the pumping device 101, the conduit 103 experiences the product surge and deflects to accommodate any increased pressures. As the pressure of the product drops, the conduit 103 is able to return to a nominal size. The swell of the conduit 103 bears against the cuff 105, thereby deflecting the cuff 105 and the attached sensor 106. As the sensor 106 deflects, corresponding voltages are output and produce a recognizable pattern. Characterization of the cyclical pressure wave pattern under normal operating conditions provides a baseline for comparison to a system void of the product being pumped. Accordingly, monitoring of the signals output by the displacement sensing device 100 may be used to discern whether the conduit contains product, as well as whether the pumping device 101 is operating correctly.

Figure 3B:
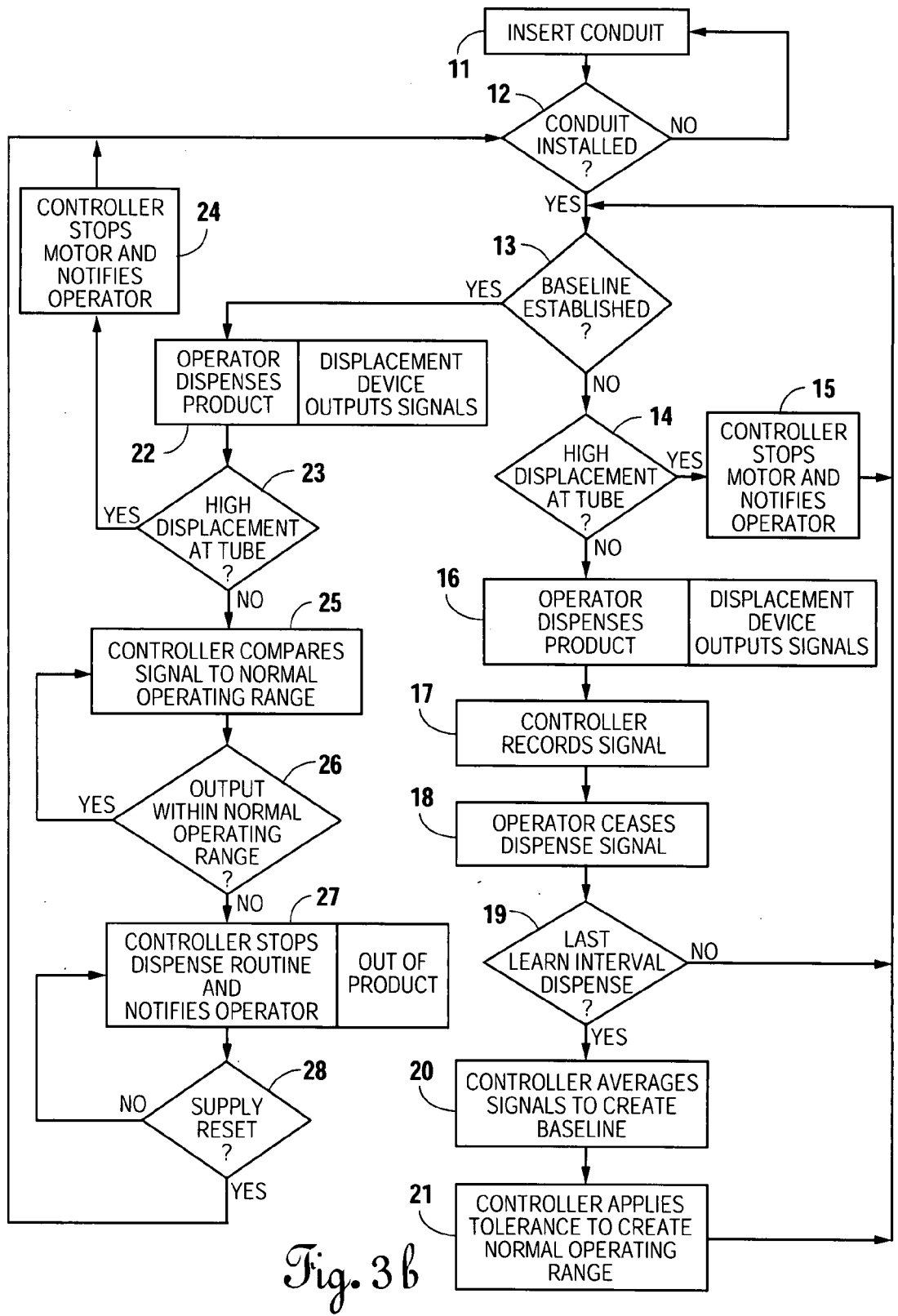
FIG. 3b provides a flowchart illustrating the method steps utilized to determine if a product system is out of product according to the second embodiment.

As shown in the method flowchart of FIG. 3b, the process of utilizing the displacement sensing device 200 commences with step 11, wherein an operator must insert a conduit 103 into the cuff 105. Once the conduit 103 is installed, the controller 112 verifies that the conduit 103 remains in the cuff 105 as shown in step 12. If the conduit 103 is not installed in the cuff 105 in step 12, the process returns to step 11, wherein the operator must reinsert the conduit 103. If the conduit 103 remains in the cuff 105, the process moves to step 13, wherein the controller 112 determines if a baseline voltage has been established. If a baseline voltage has not been established in step 13, the controller 112 proceeds to step 14, wherein it determines if a high displacement condition exists at the cuff 105.

If a high displacement condition does exist in step 14, the controller 112 must provide a signal to stop the pumping device 101, any associated dispensing, and notify the operator of the high displacement condition, step 15. The operator would then be required to alleviate the high pressure condition associated with the high displacement condition. The controller 112 may return to step 12 when the high displacement condition is alleviated. If a high displacement condition does not exist in step 14, the controller 112 proceeds to step 16 to await a dispense command from an operator. Once a dispense command has been initiated, the controller 112 provides commands to commence the dispense. Once the dispense commences, the displacement sensing device 100 outputs voltages in proportion to the amount of displacement that the conduit 103 is experiencing at the cuff 105. Step 17 provides for the controller 112 recording the voltages provided by the displacement sensing device 100.

Once the operator ceases the dispense routine, step 18, the controller 112 determines whether the dispense was the last dispense of the learn interval, step 19. If the dispense was not the last required for the learn interval, the controller 112 proceeds to step 12 to commence the routine. If the dispense was the last dispense required for the learn interval, then the controller 112 averages the voltages provided by the displacement sensing device 100 to create a baseline voltage, step 20. Once the baseline voltage has been created, the controller 112 applies a tolerance value to the baseline voltage to derive a normal operating range, step 21. The process then returns to step 12 to restart the process.

If the controller 112 determines that a baseline voltage has been established for the product in step 13, the controller 112 proceeds to step 22, wherein it awaits a dispense command from an operator. Once a dispense command has been received, the controller 112 determines if a high displacement condition exists, step 23. If a high displacement condition does exist in step 23, the controller 112 proceeds to step 24, wherein the controller 112 ceases the flow of power to the pumping device 101, stops any associated dispensing, and sends a signal to the operator, thereby notifying the operator of the high pressure condition associated with the high displacement condition. If a high displacement condition does not exist in step 23, the controller 112 moves to step 25, wherein the controller 112 commences to compare the output voltages to the normal operating range, step 26. If the controller 112 determines that the output voltages are within the normal operating range, then the controller 112 returns to step 25 for continued comparison. If the controller 112 determines that the output voltages in step 26 are outside of the normal operating range, then the controller 112 proceeds to step 27, wherein the controller 112 determines that the product system is out of product, stops the dispense routine, and sends a signal. The signal may be any type of warning, signal, or complement thereof. The controller 112 then proceeds to step 28 to determine if the product supply has been reset. If the product supply has been reset in step 28, the controller 112 may proceed to step 12 to restart the routine. If the product supply has not been reset in step 28, the controller 112 may return to step 27 to initiate an additional signal.

Figure 4A:
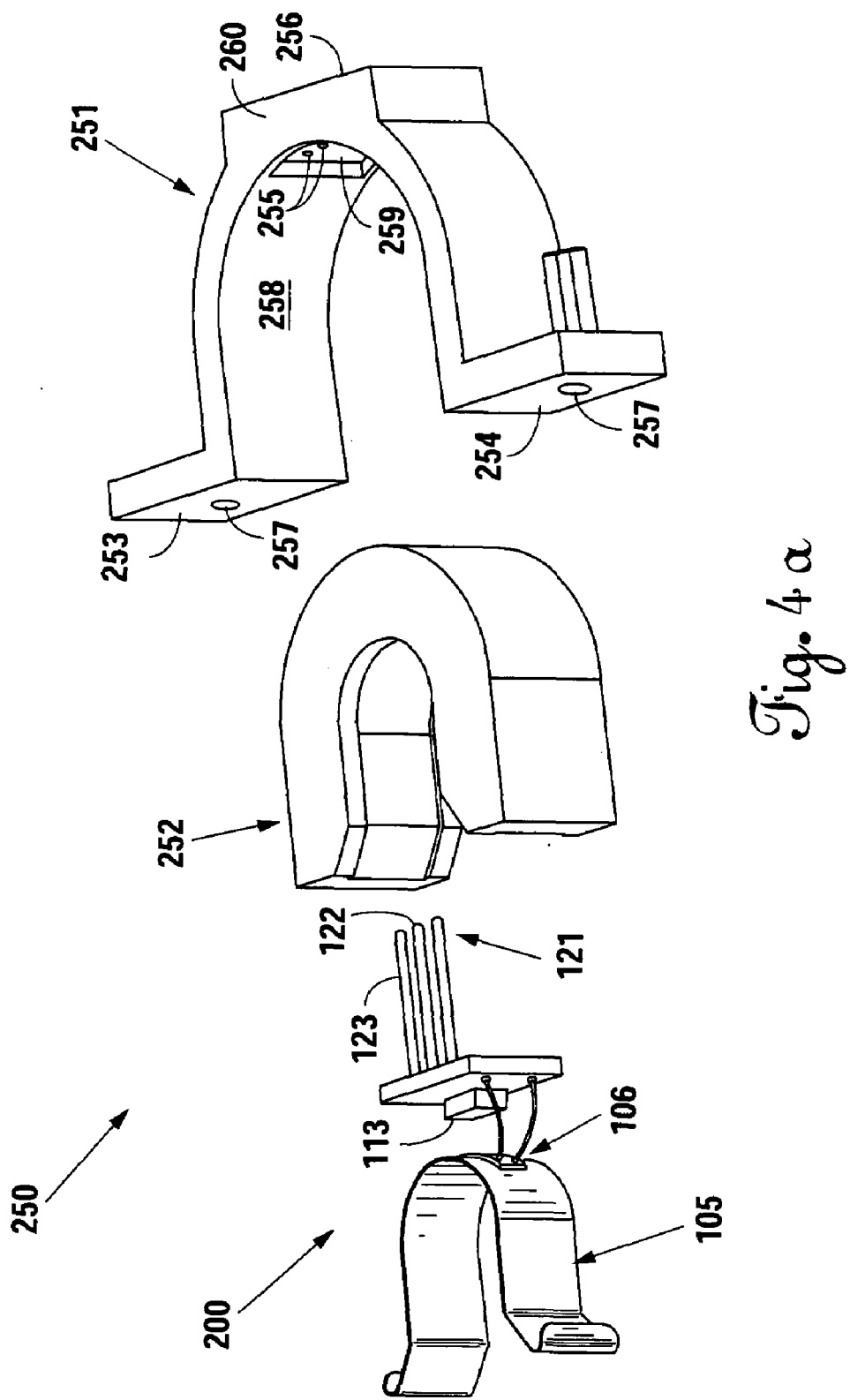
FIG. 4a provides an exploded view of the displacement sensing device in a form suitable for use in a product dispenser according to a third embodiment.

A further extension of the second embodiment is adaptable to a product dispenser, and includes the displacement sensing device 200 of the second embodiment, a mount 251, and a molded in place insert 252. As shown in FIG. 4a, the mount 251 includes a body 260 having a first extension 253, a second extension 254, an inner periphery 258 between the first and second extensions 253 and 254. The body 260 further includes a connection well 256, a recessed portion 259, and pin apertures 255 that pass from the recessed portion 259 to the connection well 256. In this embodiment, the displacement sensing unit 250 includes the signal conditioner 113 mountable to the displacement sensing device 200. The mount 251 is constructed from virtually any material having inert properties, preferably abs. The insert 252 may be constructed from any flowable inert material that does not conduct electrical signals.

On assembly, the displacement sensing device 200 and signal conditioner 113 are inserted into the inner periphery 258 of the mount 251, such that the communication pins 121, 122, and 123 pass through the pin apertures 255 of the mount 251. In the fully engaged position, the signal conditioner 113 is seated in the recessed portion 259 of the mount 251. Once fully seated, the flowable material of the insert 252 fills the voids between the displacement sensing device 200 and the mount 251. Upon solidifying, the displacement sensing unit 250 is an integral unit. Operation of the displacement sensing unit 250 is identical to the operation of the second embodiment of the displacement sensing device 200.

Figure 4B:
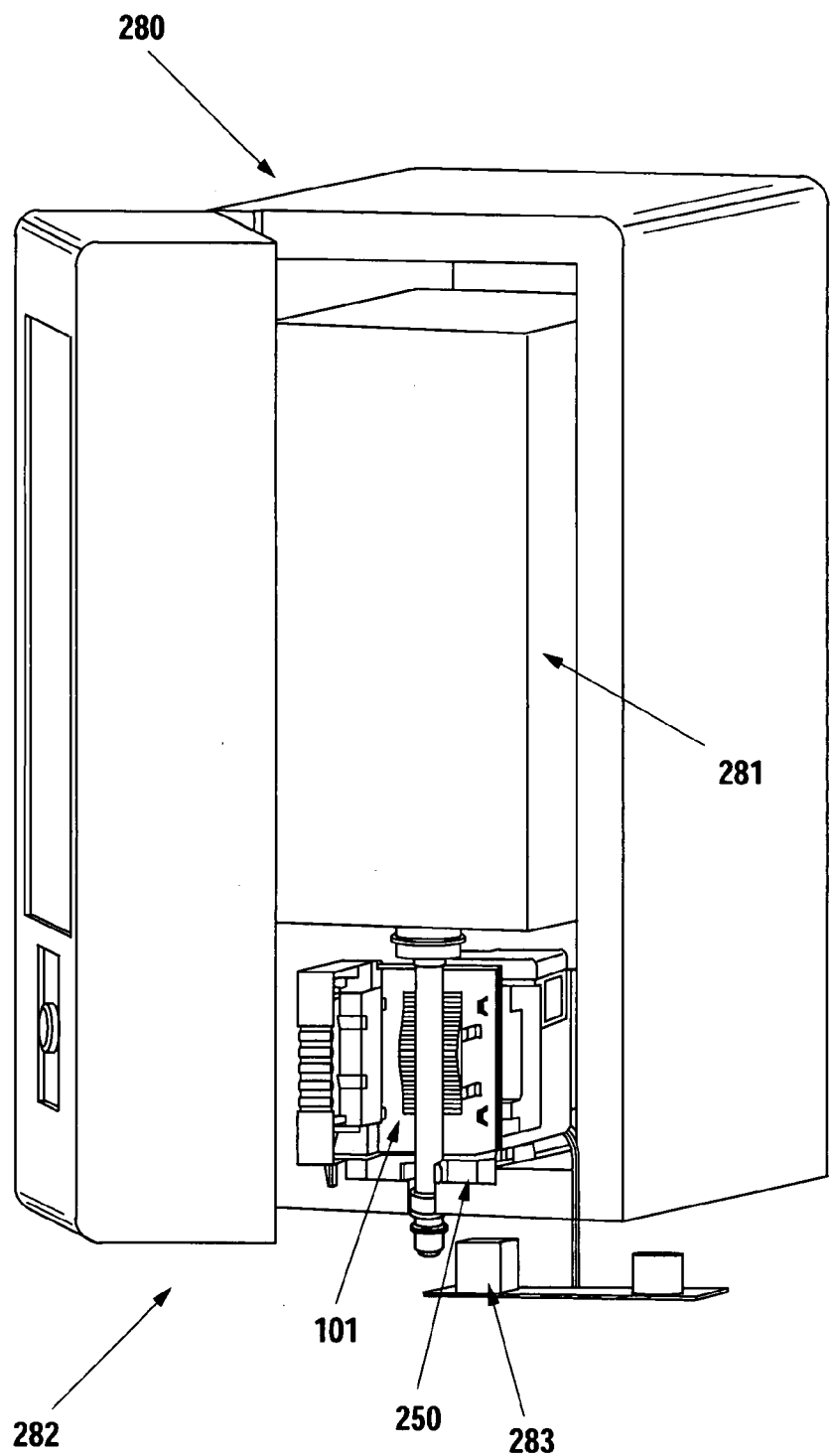
FIG. 4b provides a perspective view of the displacement sensing device installed into a product dispenser according to the third embodiment.

In use, the displacement sensing unit 250 is mountable to a dispensing valve 282 of a product dispenser 280 at a point typically beneath a product source 281, as shown in FIG. 4b. One of ordinary skill in the art will recognize that the product dispenser 280 may include any number of dispensing valves 282. One of ordinary skill in the art will further recognize that various types of pumping devices may be utilized to move the product from the product source 281, including sequential lobe pumps, peristaltic pumps, progressive cavity pumps, and the like. The product dispenser 280 may further include a controller 283 to direct and regulate the activation of the pumping device 101 and the flow of product from the product source 281. Operations of the displacement sensing unit 250 utilized within the product dispenser 280 are similar to those presented in the first and second embodiments, however, utilizing a displacement sensing unit 250 in a product dispenser 280 requires the processing of user inputs.

Figure 5A:
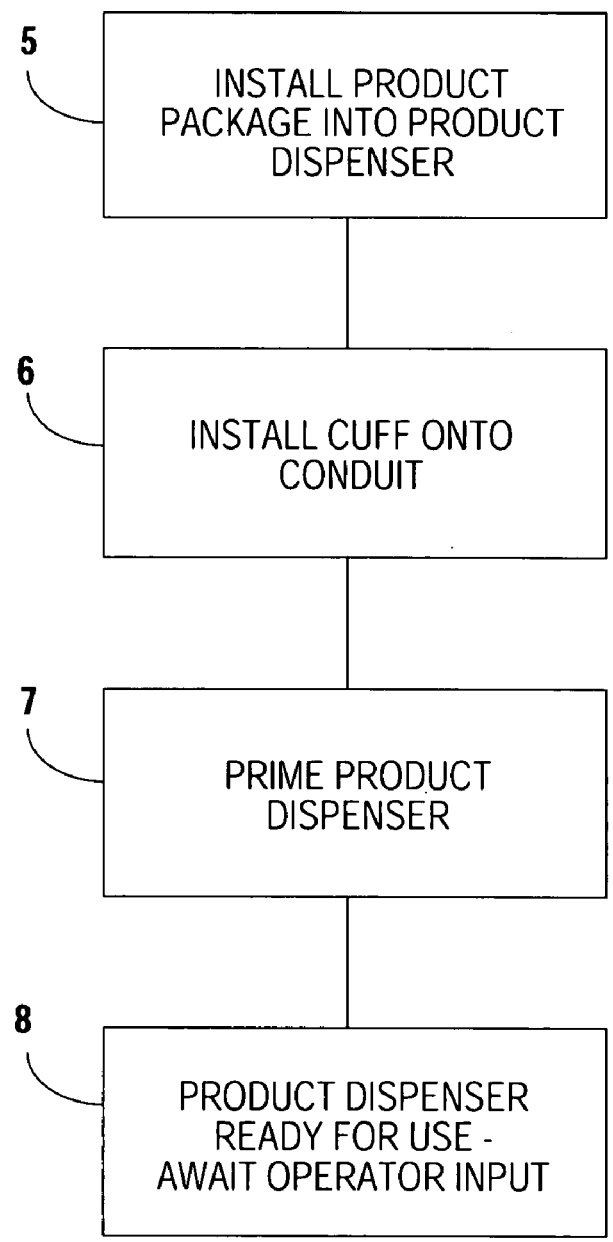
FIG. 5a provides a method flowchart illustrating the steps of preparing a product dispenser for dispensing operations according to the third embodiment.

The method flowchart of FIG. 5a illustrates the use of the displacement sensing unit 250 in combination with a product source 281 loading routine. The process commences with step 5, wherein a product source 281 is installed into the product dispenser 280. Once the product source 281 is installed, the process then moves to step 6, wherein the conduit 103 is threaded into the cuff 105. The dispensing system is then primed for dispensing operations, step 7. Once primed, the product dispenser 281 is ready for use, and awaits input from a user, step 8.

Figure 5B:
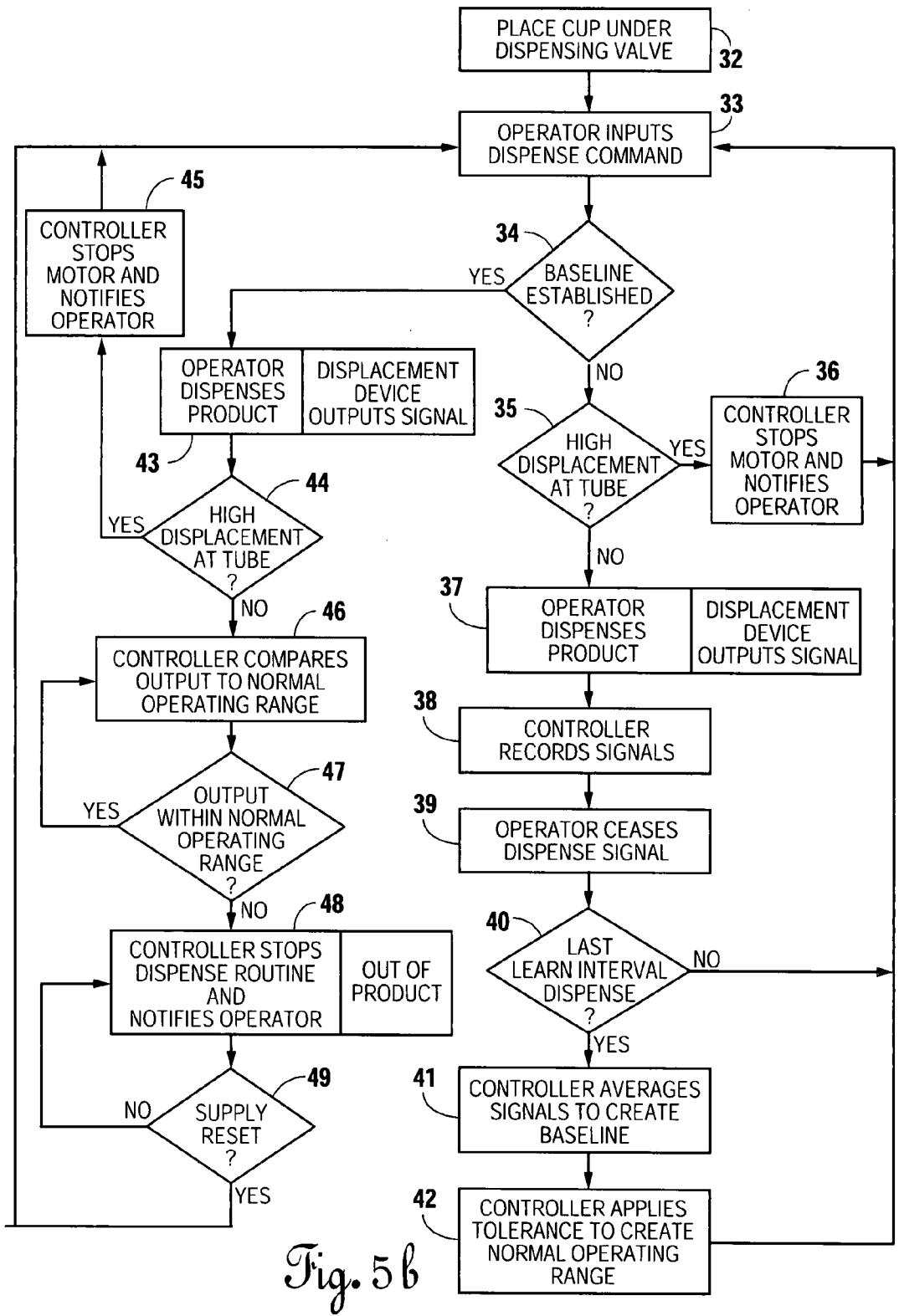
FIG. 5b provides a method flowchart illustrating the steps associated with using a product dispenser having a displacement sensing device as a sold out mechanism according to the third embodiment.

Upon completion of the product supply loading sequence, the dispenser 281 is ready for use. A user may then place a cup beneath a dispensing valve, as shown in step 32 of the method flowchart of FIG. 5b. The controller 283 in the product dispenser 280 waits for an input signal from a user, step 33. Upon receiving a signal, the controller 283 proceeds to step 34, wherein it determines if a baseline voltage has been established. If a baseline voltage has not been established in step 34, the controller 112 proceeds to step 35, wherein it determines if a high displacement condition exists at the cuff 105. If a high displacement condition does exist in step 35, the controller 112 must provide a signal to stop the pumping device 101, any associated dispensing, and notify the operator of the high displacement condition, step 36. The operator would then be required to alleviate the high pressure condition associated with the high displacement condition. The controller 112 may return to step 33 when the high displacement condition is alleviated.

If a high displacement condition does not exist in step 35, the controller 112 proceeds to step 37 to await a dispense command from an operator. Once a dispense command has been initiated, the controller 112 provides commands to commence the dispense. Once the dispense commences, the displacement sensing device 100 outputs voltages in proportion to the amount of displacement that the conduit is experiencing at the cuff 105. Step 38 provides for the controller 112 recording the voltages provided by the displacement sensing device 100.

Once the operator ceases the dispense routine, step 39, the controller 112 determines whether the dispense was the last dispense of the learn interval, step 40. If the dispense was not the last required for the learn interval, the controller 112 proceeds to step 33 to commence the routine. If the dispense was the last dispense required for the learn sequence, then the controller 112 averages the voltages provided by the displacement sensing device 100 to create a baseline voltage, step 41. Once the baseline voltage has been created, the controller 112 applies a tolerance value to the baseline voltage to derive a normal operating range, step 42. The process then returns to step 33 to wait for additional user inputs.

If the controller 112 determines that a baseline voltage has been established for the product in step 34, the controller 112 proceeds to step 43, wherein it commences the dispense command. Once a dispense command has been initiated, the controller 112 determines if a high displacement condition exists, step 44. If a high displacement condition does exist in step 44, the controller 112 proceeds to step 45, wherein the controller 112 ceases the flow of power to the pumping device 101, stops any associated dispensing, and sends a signal to the operator, thereby notifying the operator of the high pressure condition associated with the high displacement condition. If a high displacement condition does not exist in step 44, the controller 112 moves to step 46, wherein the controller 112 commences to compare the output voltages to the normal operating range, step 47.

If the controller 112 determines that the output voltages are within the normal operating range, then the controller 112 returns to step 46 for continued comparison. If the controller 112 determines that the output voltages in step 47 are outside of the normal operating range, then the controller 112 proceeds to step 48, wherein the controller 112 determines that the product system is out of product, stops the dispense routine, and sends a signal. The signal may be any type of warning, signal, or complement thereof. The controller 112 then proceeds to step 49 to determine if the product supply has been reset. If the product supply has been reset in step 49, the controller 112 may proceed to step 33 to await further inputs. If the product supply has not been reset in step 49, the controller 112 may return to step 48 to initiate an additional signal.

In a fourth embodiment, the displacement sensing device 200 of the previous embodiments may be utilized with or without a pumping device that induces a pressure wave pattern into the product. In this fourth embodiment, a displacement wave inductor and recognition system 400 includes a displacement sensing device 410 and a fluid displacement inductor 420. The displacement sensing device 410 may be identical to any variation of the displacement sensing devices mentioned in the previous embodiments. As previously described, a cuff 105 containing a sensor 106 is situated around a conduit 103 to monitor the deflection of the conduit 103 due to product displacement. The sensor 106 is rigidly attached to the cuff 105, such that the sensor 106 deflects with the cuff 105 and produces a voltage profile in direct relation to the amount of deflection experienced by the cuff 105. The fluid displacement inductor 420 may be any device capable of inducing a wave into the product stream without injuring the product package, including low impact contact, sonic waves, and the like.

On assembly, the displacement sensing device 410 is mounted onto a conduit 103 attached to a product source 102. The fluid displacement inductor 420 is then mounted adjacent to the product source 102, such that it may engage the product source 102. In a product dispenser 280 embodiment, the fluid displacement inductor 420 may be built into the product dispenser 280, such that it engages the product source 281 upon installation. Operation of the displacement wave inductor and recognition system 400 is substantially identical to the third embodiment. As the controller 112 continuously allows the fluid displacement inductor 420 to induce a displacement wave within the product system, the methods utilized in the displacement wave induction scenario are similar to the method flowcharts of FIGS. 3*b* and 5*b*, however, the displacement wave induction system 400 in this embodiment may not include a pumping device.

In use, the fluid displacement inductor 420 displaces product in the product system to create a wave into the product system, such that it may be received by the displacement sensing device 410 disposed around the conduit 103. A conduit 103 disengaged from the cuff 105 does not transmit a displacement wave to the cuff 105, thereby notifying the controller 112 that a problem exits. Further, an absent displacement wave notifies the controller 112 that the product system is out of product.

Figure 6A:
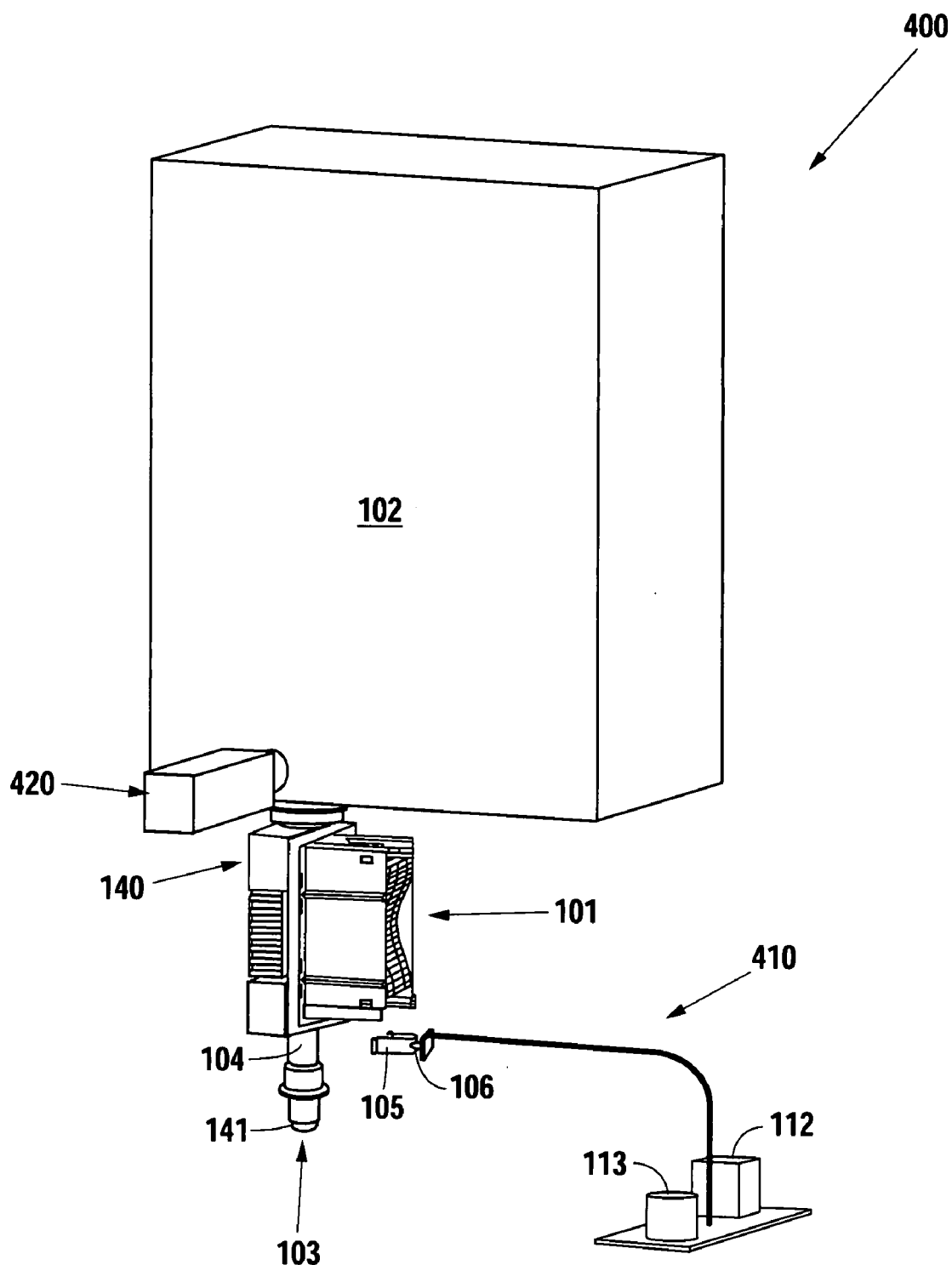
FIG. 6a provides a perspective view of the displacement sensing device according to a fourth embodiment including a pressure wave inductor.
Figure 6B:
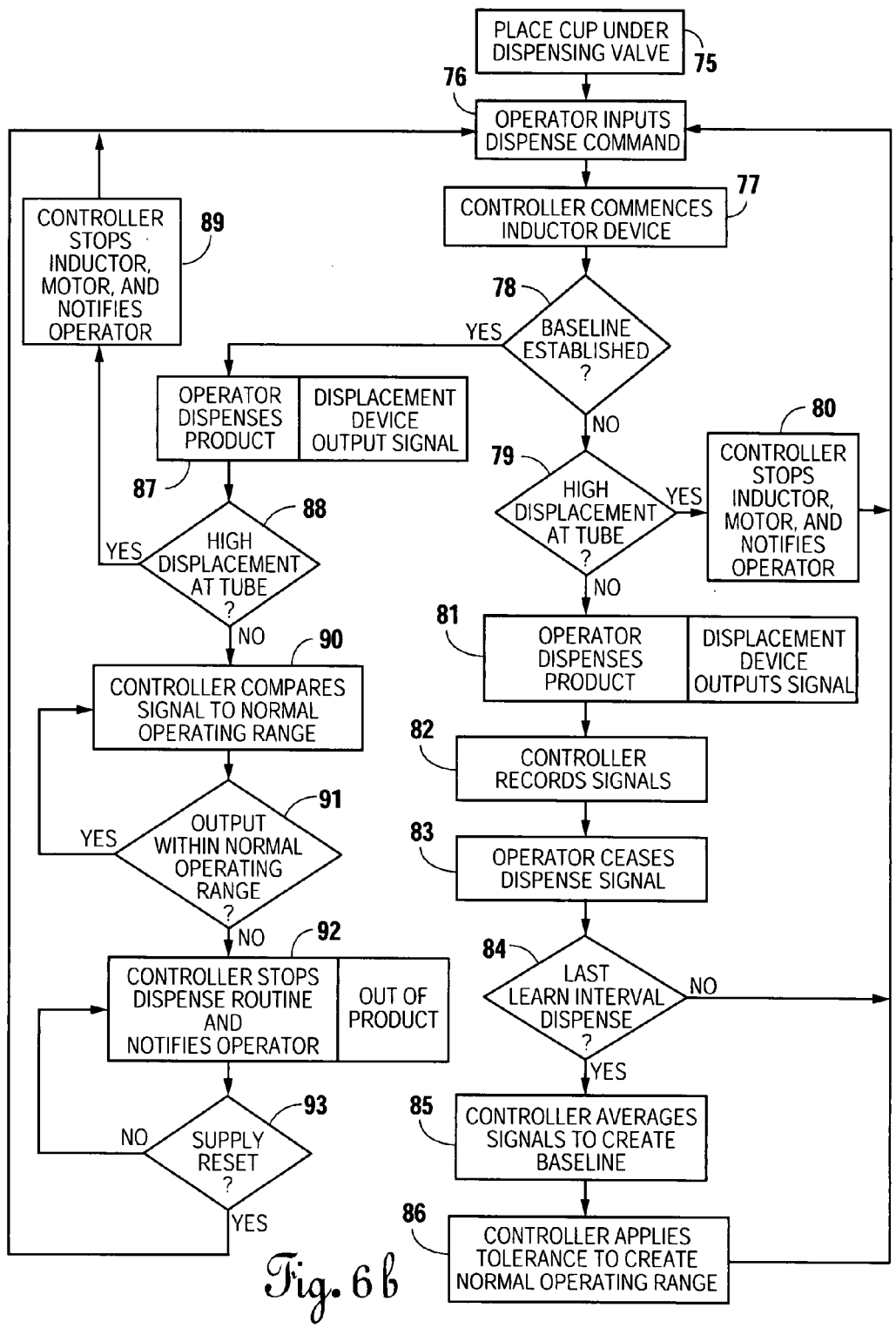
FIG. 6b provides a method flowchart illustrating the steps associated with utilizing the displacement sensing device with a pressure wave inductor according to the fourth embodiment.

As shown in FIG. 6*b*, the method steps for utilizing the fluid wave induction and recognition system begin with step 75, wherein an operator places a cup beneath a valve. The operator may then input a dispense command as shown in step 76. Once a dispense command is initiated, the controller 112 provides power to the fluid displacement inductor 420, step 77. The controller 112 then proceeds to step 78 to determine if a baseline voltage has been established. If a baseline voltage has not been established in step 78, the controller 112 proceeds to step 79, wherein it determines if a high displacement condition exists at the cuff 105. If a high displacement condition does exist in step 79, the controller 112 must provide a signal to stop the fluid displacement inductor 420, any associated dispensing operations, and notify the operator of the high displacement condition, step 80. The operator would then be required to alleviate the high pressure condition associated with the high displacement condition. The controller 112 may return to step 76 when the high displacement condition is alleviated. If a high displacement condition does not exist in step 79, the controller 112 proceeds to step 81 to await a dispense command from an operator. Once a dispense command has been initiated, the controller 112 provides commands to commence the dispense. Once the dispense commences, the displacement sensing device 100 outputs voltages in proportion to the amount of displacement that the conduit 103 is experiencing at the cuff 105. Step 82 provides for the controller 112 recording the voltages provided by the displacement sensing device 200.

Once the operator ceases the dispense routine, step 83, the controller 112 determines whether the dispense was the last dispense of the learn sequence, step 84. If the dispense was not the last required for the learn sequence, the controller 112 proceeds to step 76 to await further instructions. If the dispense was the last dispense required for the learn sequence, then the controller 112 averages the voltages provided by the displacement sensing device 100 to create a baseline voltage, step 85. Once the baseline voltage has been created, the controller 112 applies a tolerance value to the baseline voltage to derive a normal operating range, step 86. The process then returns to step 76 to wait for additional user inputs.

If the controller 112 determines that a baseline voltage has been established for the product in step 78, the controller 112 proceeds to step 87, wherein it initiates the dispense command. Once the dispense command has been initiated by the controller 112, the controller 112 determines if a high displacement condition exists, step 88. If a high displacement condition does exist in step 88, the controller 112 proceeds to step 89, wherein the controller 112 ceases the flow of power to the inductor 420, stops any associated dispensing, and sends a signal to the operator, thereby notifying the operator of the high pressure condition associated with the high displacement condition.

If a high displacement condition does not exist in step 88, the controller 112 moves to step 90, wherein the controller 112 commences to compare the output voltages to the normal operating range, step 91. If the controller 112 determines that the output voltages are within the normal operating range, then the controller 112 returns to step 90 for continued comparison. If the controller 112 determines that the output voltages in step 91 are outside of the normal operating range, then the controller 112 proceeds to step 92, wherein the controller 112 determines that the product system is out of product, stops the dispense routine, and sends a signal. The signal may be any type of warning, alarm, signal, or complement thereof. The controller 112 then proceeds to step 93 to determine if the product supply has been reset. If the product supply has been reset in step 93, the controller 112 may proceed to step 76 to await further inputs. If the product supply has not been reset in step 93, the controller 112 may return to step 92 to initiate an additional signal.

Figure 7A:
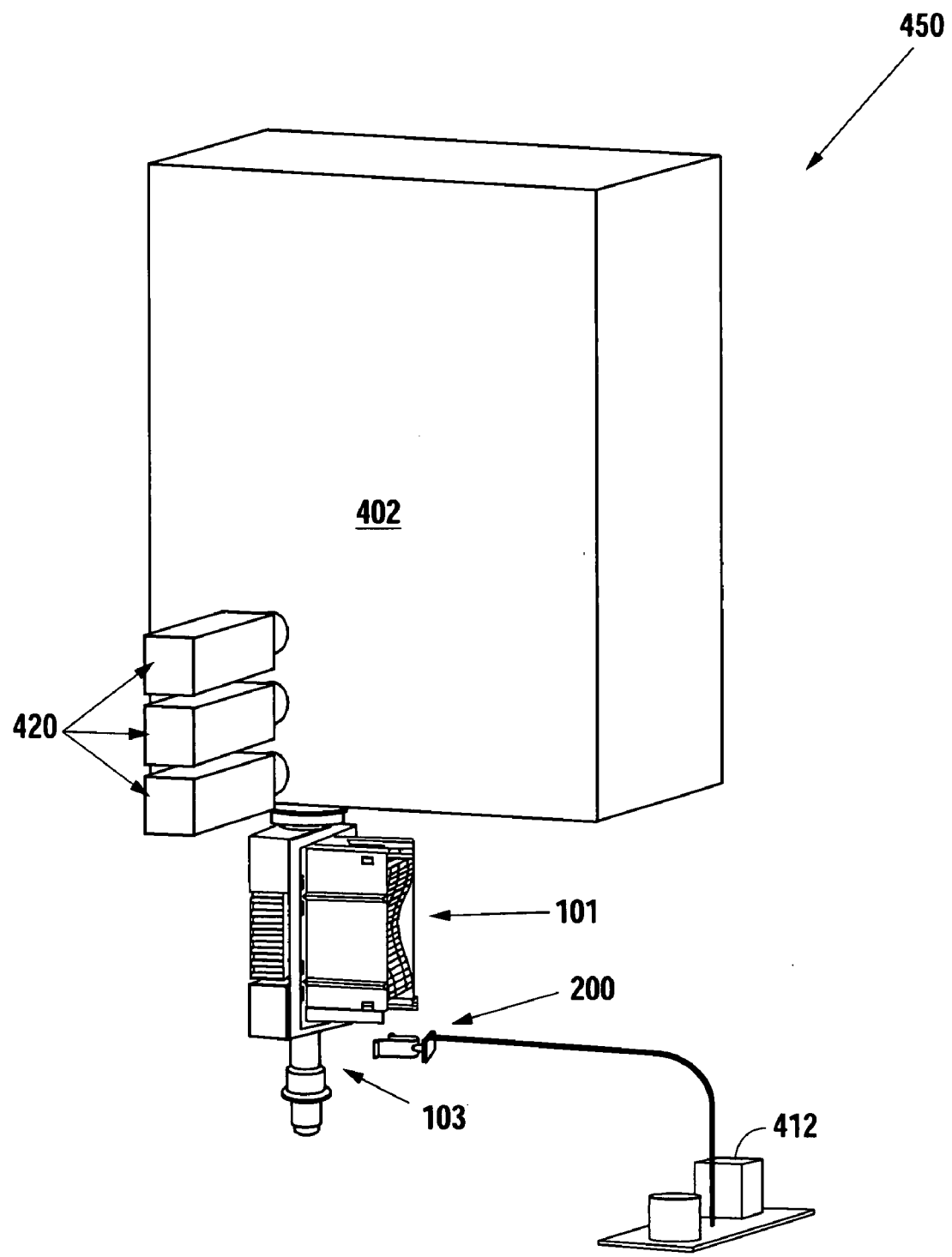
FIG. 7a provides a side view of the displacement sensing device utilized as a liquid level indicator according to a fifth embodiment.

In a fifth embodiment, fluid level tracking device 450 derives the level of a product in a product system. As shown in FIG. 7a, multiple fluid displacement inductors 420 may be installed at varying heights adjacent to a product source 402. The fluid displacement inductors 420 are identical to those previously described, and may be operated by a controller 412. The fluid level tracking system 450 further includes a displacement sensing device 200 disposed on a conduit 103. The fluid level tracking device 450 may be utilized with or without a pumping device 101. If a pumping device 101 is utilized, it should be located downstream from the displacement sensing device 200.

On assembly, the fluid wave inductors 420 are installed adjacent to the product source 402, such that when the fluid wave inductors 420 are activated, they displace a portion of the product located in the product source, thereby sending a wave throughout the product. A cuff 105 of the displacement sensing device 200 is installed onto the conduit 103 to measure the displacement of the conduit 103. The fluid level tracking device 450 may further include a pumping device 101 in communication with the conduit, such that the pumping device 101 positively displaces product located within the conduit 103. Upon activation of the pumping device 101, the product disposed in the product source 402 is moved from the product source 402 to an outlet or point of use. The controller 412 is in communication with the fluid wave inductors 420 and the displacement sensing device 200, such that the controller 412 receives signals from the displacement sensing device 200 when the cuff 105 deflects, and the controller 412 delivers signals to the fluid wave inductors 420.

In use, the controller 412 activates the fluid wave inductors 420 one at a time to send a fluid wave into the product. If the displacement sensing device 200 registers the displacement associated with the induction of the fluid wave, then the controller 412 determines that there is product up to the level of that particular fluid wave inductor 420. An unregistered fluid wave indicates that the fluid level has dropped below the level of the discharging fluid wave inductor 420.

Figure 7B:
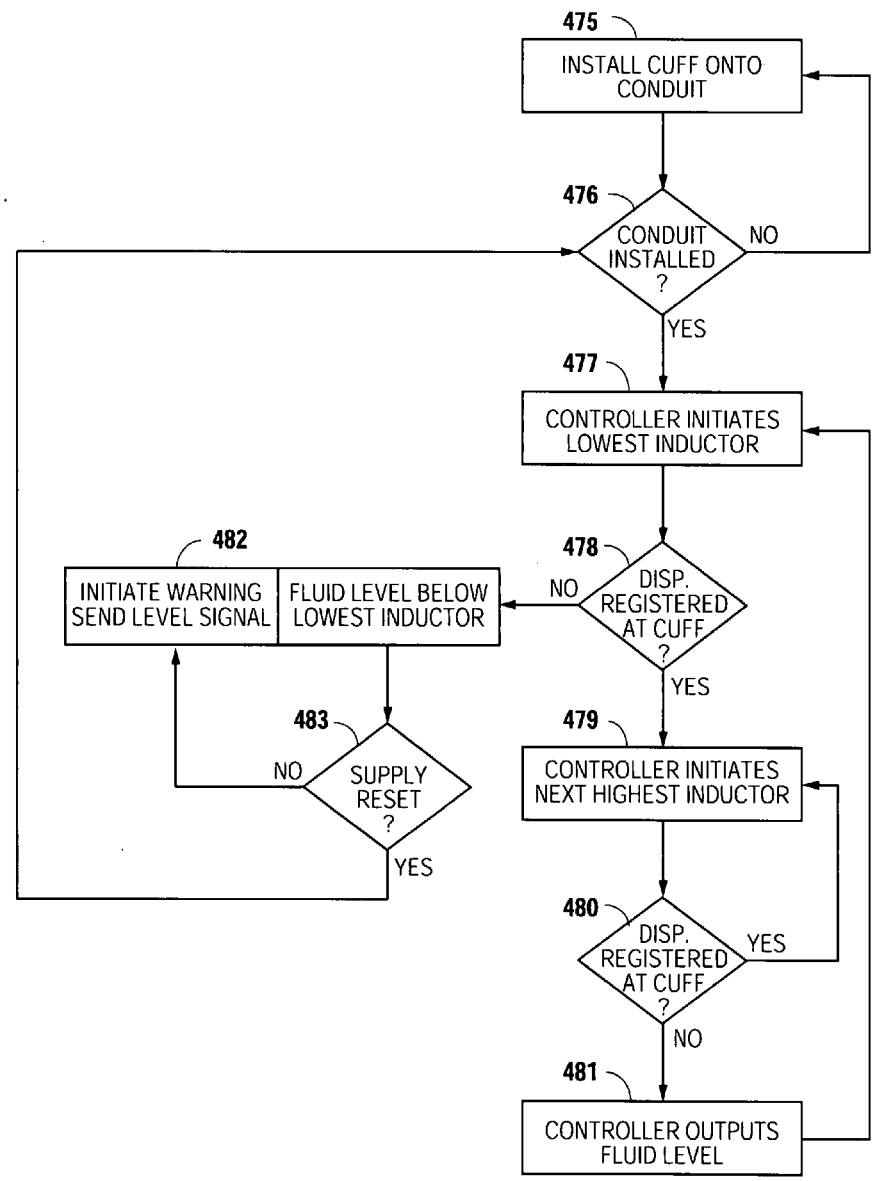
FIG. 7b provides a method flowchart illustrating the steps of utilizing the displacement sensing device as a liquid level indicator according to the fifth embodiment.
Figure 8A:
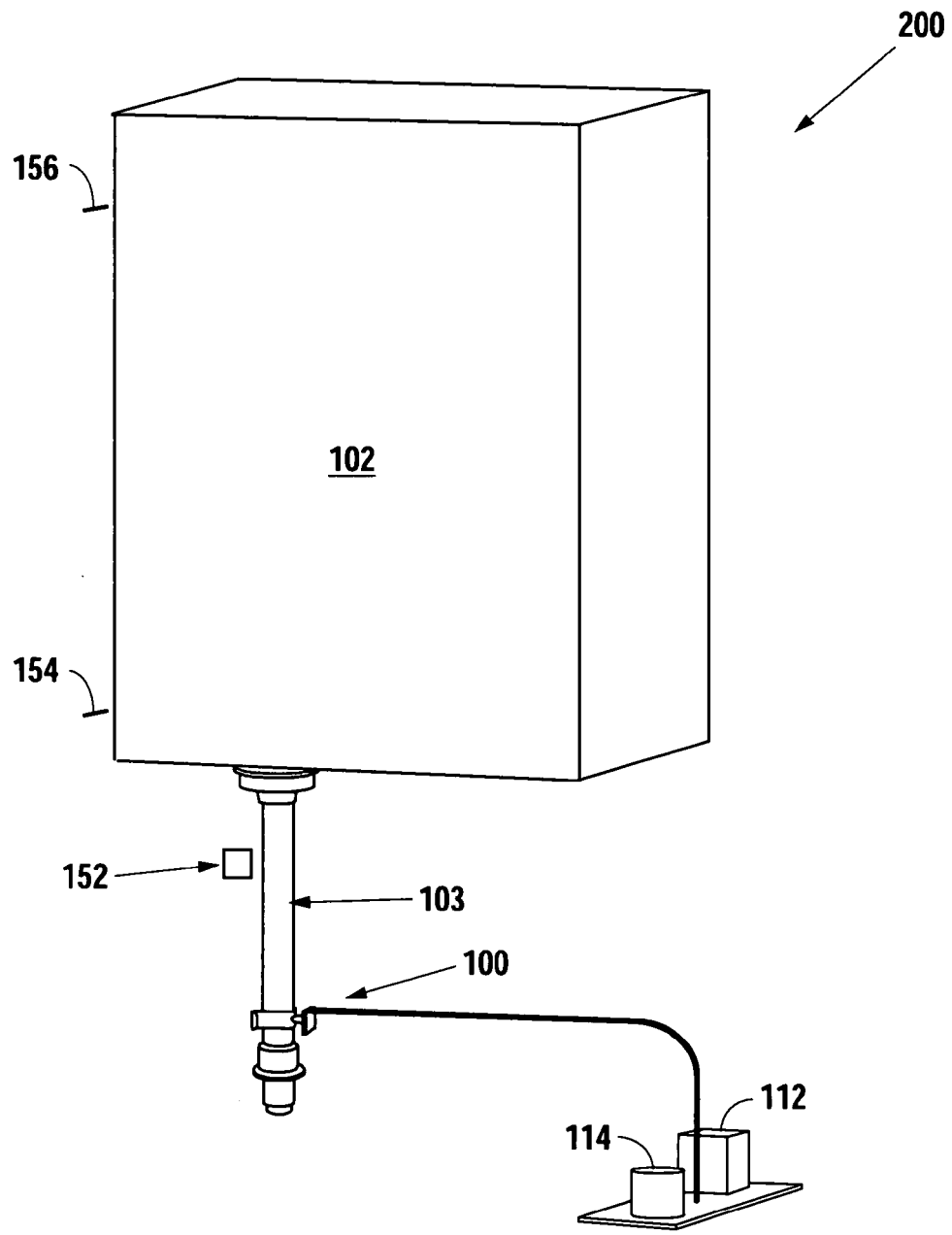
FIG. 8a provides a perspective view of a sixth embodiment utilized as a fluid level indicator.
Figure 8B:
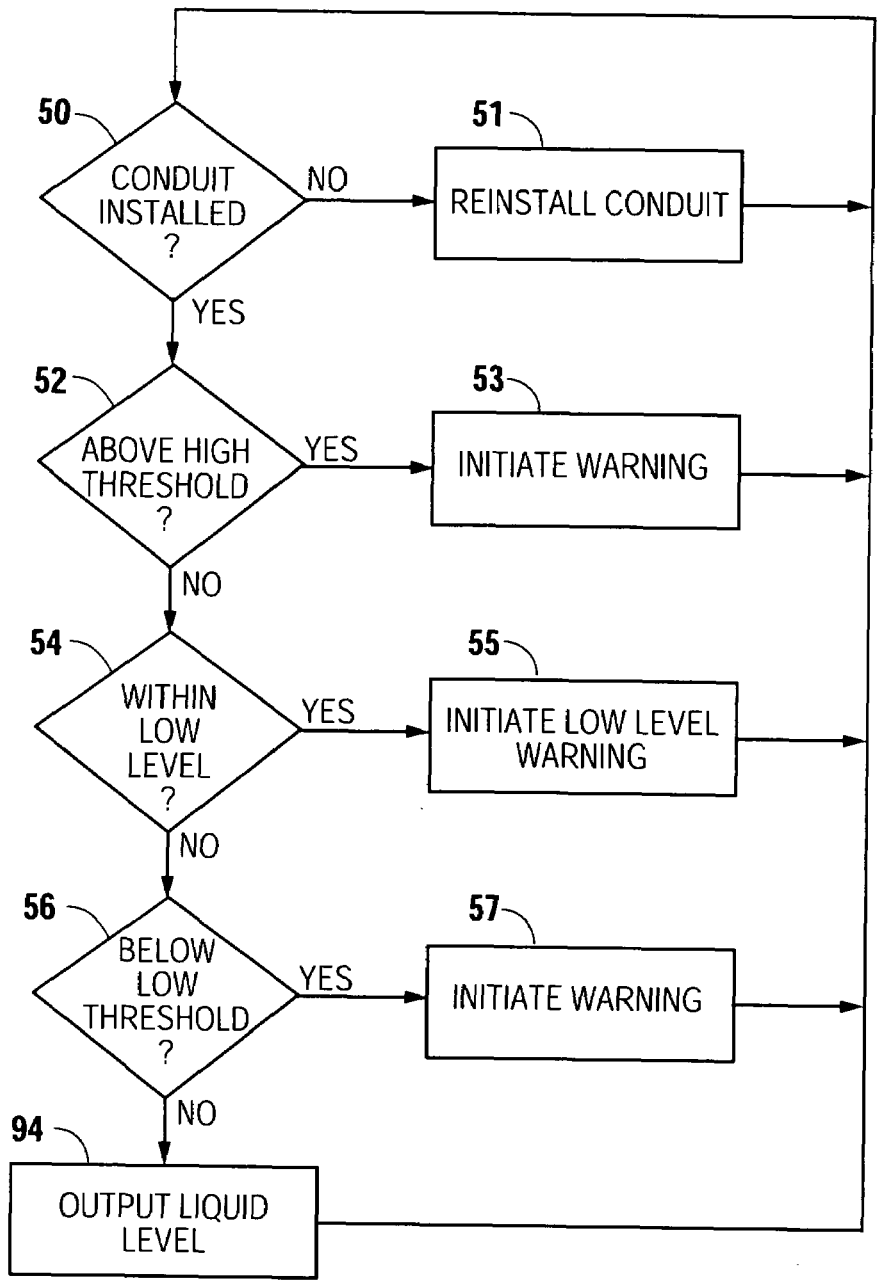
FIG. 8b provides a method flowchart illustrating the steps associated with discerning a fluid level according to the sixth embodiment.

One form of utilizing the fluid level tracking device 450 is shown in the method flowchart of FIG. 7b. The process commences with step 475, wherein an operator inserts the cuff 105 onto a conduit 103. After insertion, the controller 412 verifies the presence of a conduit 103 in the cuff 105, step 476. If the conduit 103 is not installed in the cuff 105, the controller 412 returns to step 475. If a conduit 103 is installed in the cuff 105 in step 476, the controller 412 moves to step 477, wherein the controller 412 initiates the induction of a fluid wave into the product by the lowest fluid wave inductor 420. The controller 412 then proceeds to step 478, wherein it must determine if a product displacement was experienced by the cuff 105. If a displacement is not recognized in step 478, then the controller moves to step 482 to initiate a warning, as the fluid level is below a lowest discernable threshold. The process then moves to step 483, wherein the controller 412 then determines if the product supply has been reset. If the product supply has not been reset, the controller 412 returns to step 482 to initiate an additional warning. If the product supply has been reset in step 483, the controller 412 then returns to step 476 to commence the routine.

If the displacement is registered at the cuff 105 in step 478, the controller proceeds to step 479, wherein the controller initiates the fluid wave induction of the next highest fluid wave inductor 420. The controller 412 then determines if displacement at the cuff has been registered by the displacement sensing device 200, step 480. If a displacement has been detected in conjunction with the fluid wave induction, the controller 412 returns to step 479 to initiate the next highest fluid wave inductor 420. The controller 412 then returns to step 480 to determine if a displacement at the cuff 105 has been registered by the displacement sensing device 200. This step may be repeated as many times as there are fluid wave inductors 420. If a displacement is not registered in step 480, the controller 412 proceeds to step 481, wherein the controller 412 determines that the fluid level is at that increment, and outputs the fluid level information. Once the fluid level information is output by the controller 412, the controller 412 returns to step 477 to restart the routine.

In a sixth embodiment, the displacement sensing device 100 of the first embodiment may be utilized in a liquid level sensing system 150 for use in open or gravitational flow systems utilizing a flexible conduit. As shown in FIG. 7a, the liquid level sensing system 150 is virtually identical to the first embodiment in design and operation, and accordingly, like parts have been referenced with like numerals. The liquid level sensing system 150 may further include a shutoff 152 as a flow controller. The shutoff 152 may be any device suitable for stopping and commencing the flow of product from the product supply 102, including manual valves, solenoid actuated valves, and the like.

In use, voltage profiles are recorded for various fluid levels in the product supply 102. One of ordinary skill in the art will recognize that at a minimum, a full level 156 and a low level 154 in the product supply 102 should be recorded. One of ordinary skill in the art will further recognize that the head height between the high level 156 and the low level 154 may be segmented into virtually any number of increments. A voltage profile associated with the liquid level at each increment may be utilized to characterize the liquid level in the product supply 102 based on the displacement experienced by the displacement sensing device 100. Once the voltage profiles are characterized, a portion of head heights directly above the low level voltage 154 may be designated a low level warning area. The low level warning area may then be flagged to alert an operator of a low level in the product supply 102.

The steps for using the liquid level sensing system 150 are provided in the method flowchart of FIG. 7b. The process commences with step 50, wherein the controller 112 determines if the conduit 103 is installed into the cuff 105. If the conduit 103 is not installed into the cuff 105, the controller 112 moves to step 51, wherein it waits for a conduit 103 to be installed into the cuff 105. Once installed, the controller 112 returns to step 50. If a conduit 103 is installed in the cuff 105 in step 50, the controller 112 proceeds to step 52, wherein it determines if the fluid level is above the high level 156. If the fluid level is above the high level in step 51, then the controller 112 initiates a warning.

If the liquid level is not above the full level 156 in step 52, the controller 112 proceeds to step 54, wherein it determines if the liquid level is within the low level range. If the liquid level is within a low level range, the controller 112 proceeds to step 55, wherein it initiates a low level warning. If the liquid level in step 54 in not within the low level range, then the controller 112 moves to step 56, wherein it determines if the liquid level is below the low level 154. If the liquid level is below the low level 154 point, the controller 112 proceed to step 57, wherein it initiates a warning. If the liquid level is not below the low level 154, the controller 112 outputs the liquid level information, as shown in step 94.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

We claim:

1. A displacement sensing device, comprising:
   a cuff adapted to receive at least a portion of a conduit therein, whereby a flow of product through the conduit displaces the conduit, and further whereby the cuff displaces relative to the conduit; and
   a sensor disposed on an outer periphery of the cuff such that, upon insertion of the conduit into the cuff, the sensor resides a thickness of the cuff from the outer periphery of the conduit, whereby the sensor senses the displacement of the cuff and outputs a signal indicative of conduit displacement.

2. The displacement sensing device according to claim 1, wherein at least a portion of the cuff is complementary in shape to the outer periphery of the conduit.

3. The displacement sensing device according to claim 1, further comprising:
   a controller, wherein the controller compares the signal to a normal operating range to determine if a product system is operating within the normal operating range.

4. The displacement sensing device according to claim 3, wherein the controller determines that the product system is out of product when the signal is outside of the normal operating range.

5. The displacement sensing device according to claim 3, wherein the controller determines that the product system is operating at an excessive pressure if the signal is above a predetermined high threshold.

6. The displacement sensing device according to claim 3, further comprising:
   an alarm in communication with the controller, wherein the alarm is activated when the controller determines that the product system is operating outside of the normal operating range.

7. The displacement sensing device according to claim 1, further comprising:
   a controller, wherein the controller polls the sensor to receive therein at least two signals indicative of conduit displacement.

8. The displacement sensing device according to claim 7, wherein the controller processes the at least two signals to create a baseline.

9. The displacement sensing device according to claim 8, wherein the controller applies a tolerance to the baseline to create a normal operating range.

10. The displacement sensing device according to claim 9, wherein the controller derives the normal operating range to self adjust to any product.

11. The displacement sensing device according to claim 10, wherein the controller polls the sensor to receive therein a signal indicative of conduit displacement, and further wherein the controller compares the signal to the normal operating range to determine if a product system is operating within the normal operating range.

12. The displacement sensing device according to claim 11, wherein the controller determines that the product system is out of product when the signal is outside of the normal operating range.

13. The displacement sensing device according to claim 11, wherein the controller determines that the product system is operating at an excessive pressure if the signal is above a predetermined high threshold.

14. The displacement sensing device according to claim 11, further comprising:
   an alarm in communication with the controller, wherein the alarm is activated when the controller determines that the product system is operating outside of the normal operating range.

15. The displacement sensing device according to claim 1, wherein the displacement of the conduit includes expansion and contraction of the conduit.

16. The displacement sensing device according to claim 15, wherein the conduit expands and contracts due to the movement of the product disposed within the conduit.

17. The displacement sensing device according to claim 8, wherein the controller periodically receives new signals to generate an updated baseline.

18. A method of sensing product displacement, comprising:
   a. placing a sensor on an outer periphery of a cuff adapted to receive at least a portion of a conduit therein;
   b. measuring a displacement of the cuff disposed on a conduit in a product system; and
   c. outputting a signal in direct relation thereto.

19. The method of sensing product displacement according to claim 18, further comprising:
   d. receiving the signal with a controller; and
   e. comparing the signal to a normal operating range to determine if the product system is operating outside of the normal operating range.

20. The method of sensing product according to claim 18, further comprising:
   d. receiving at a controller at least two signals indicative of displacement;
   e. processing the at least two signals to create a baseline; and
   f. applying a tolerance to the baseline to derive a normal operating range.

21. The method of sensing product displacement according to claim 20, further comprising:
   g. receiving at the controller a signal indicative of current displacement; and
   h. comparing the current signal to the derived normal operating range to determine if the product system is operating outside of the normal operating range.

22. The method of sensing product displacement according to claim 21, further comprising:

i. determining that the product system is out of product when the current signal is outside of the normal operating range.

23. The method of sensing product displacement according to claim 22, further comprising:
   j. initiating a signal indicative of an out of product condition.

24. The method of sensing product displacement according to claim 21, further comprising:

i. determining that the product system is operating at an increased pressure when the signal is above a predetermined high threshold.

25. The method of sensing product displacement according to claims 24, further comprising:
   j. initiating a signal indicative of a high pressure condition.

* * * * *